UNITED STATES PATENT OFFICE.

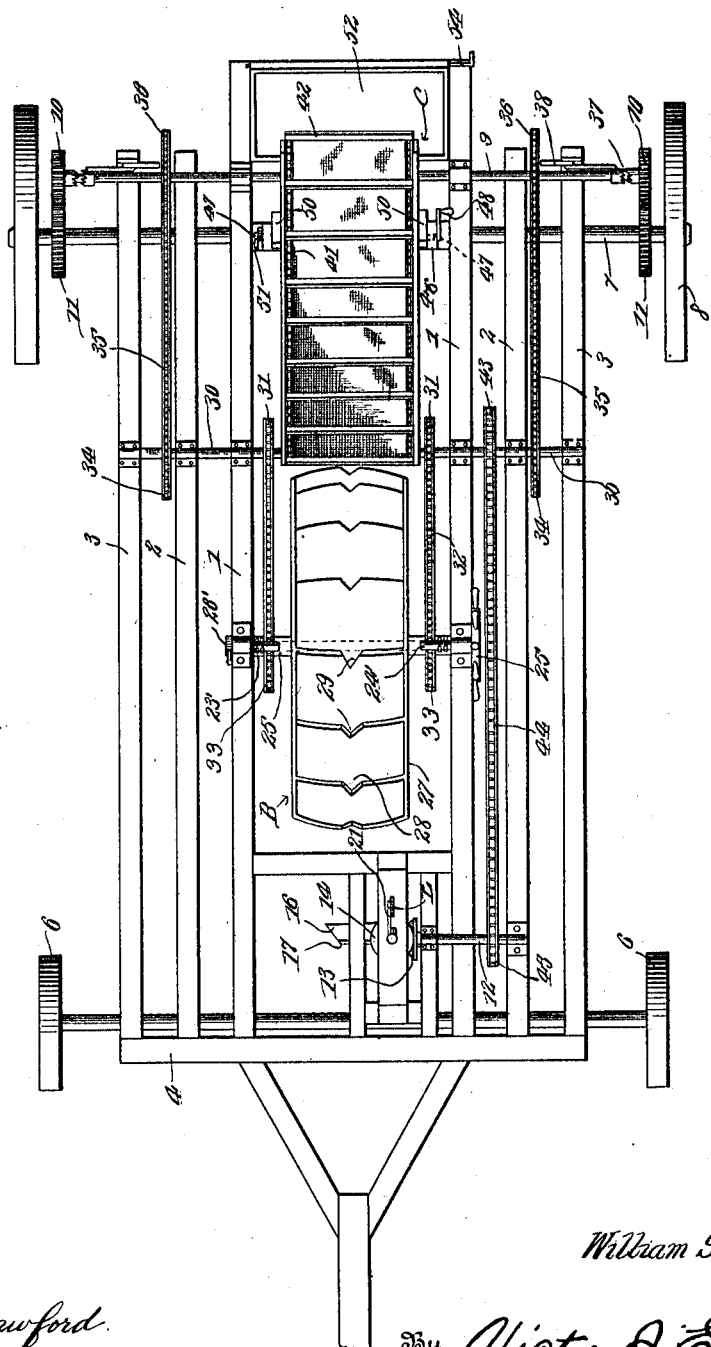

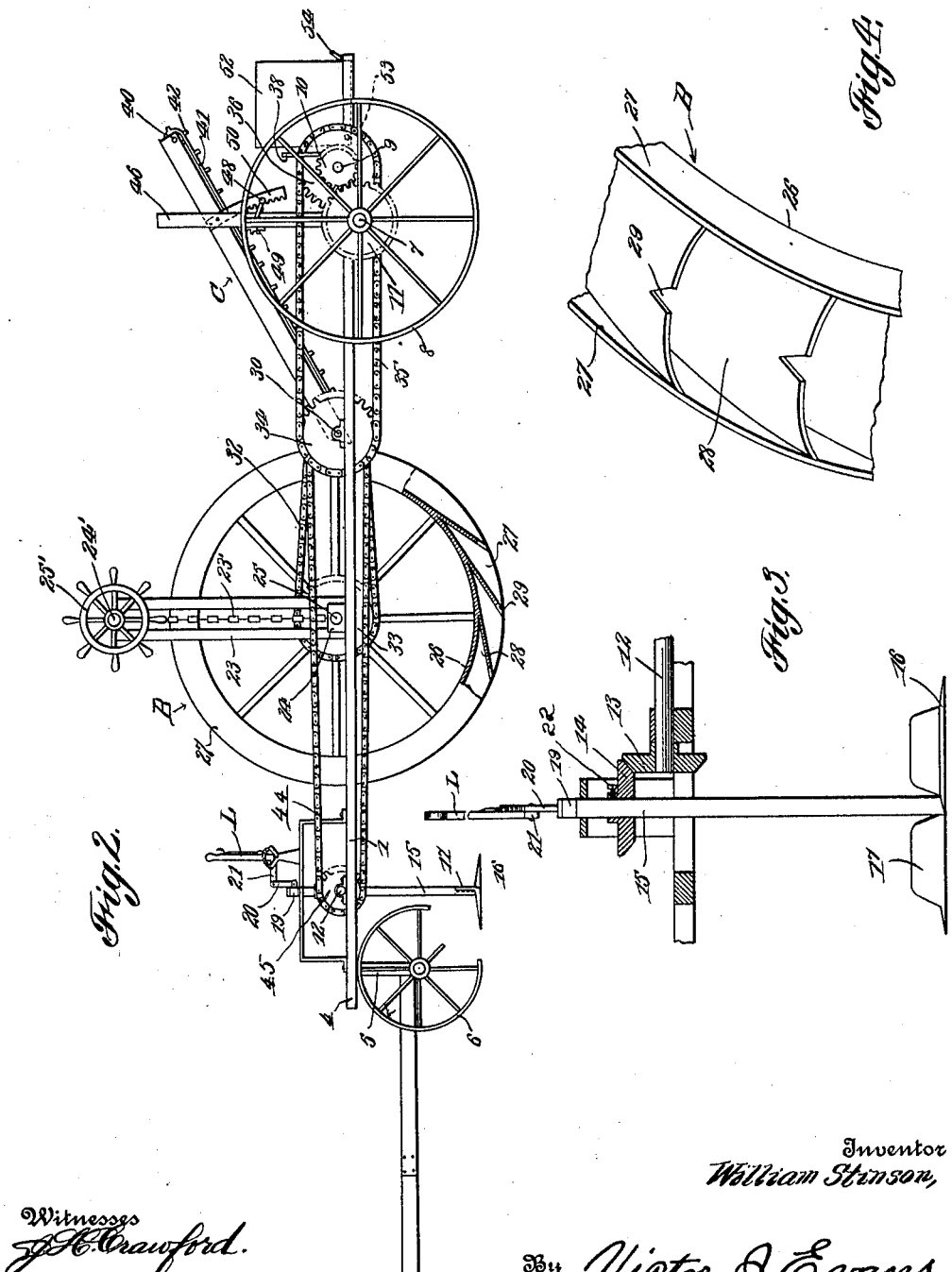

WILLIAM STINSON, OF PIPESTONE, MANITOBA, CANADA.

BEET-HARVESTER.

1,004,156.   Specification of Letters Patent.   Patented Sept. 26, 1911.

Application filed October 3, 1910.   Serial No. 585,139.

*To all whom it may concern:*

Be it known that I, WILLIAM STINSON, a subject of the King of Great Britain, residing at Pipestone, in the Province of Manitoba and Dominion of Canada, have invented new and useful Improvements in Beet-Harvesters, of which the following is a specification.

This invention relates to beet harvesters. It has for its object to provide a simple and efficient machine whereby the beets after being topped by suitable means provided for the purpose, shall be lifted from the ground and carried to a conveyer, whereby they are conveyed to a box or receptacle.

With these and other ends in view which will readily appear as the nature of the invention is better understood, the same consists in the improved construction and novel arrangement and combination of parts, which will be hereinafter fully described and particularly pointed out in the claims.

In the accompanying drawings has been illustrated a simple and preferred form of the invention; it being understood, however, that no limitation is necessarily made to the precise structural details therein exhibited, but that changes, alterations and modifications within the scope of the invention may be resorted to, when desired.

In the drawings:—Figure 1 is a top plan view of a machine constructed in accordance with the invention; Fig. 2 is a side elevation of the same, partly in section; Fig. 3 is a transverse sectional detail view illustrating the topping mechanism; Fig. 4 is a perspective detail view showing a portion of the lifting wheel.

Corresponding parts in the several figures are denoted by like characters of reference.

A suitable frame comprising longitudinal side bars 1, 1, 2, 2, and 3, 3, and a front bar 4 is supported adjacent to its front end upon a guiding truck 5 having wheels 6 and adjacent to its rear end upon an axle 7 having ground wheels 8, said axle being supported for rotation in suitable bearings upon the longitudinal frame bars. Supported for rotation in suitable bearings in rear of the axle is a counter-shaft 9 having pinions 10 meshing with spur wheels 11 upon the axle, adjacent to the ground wheels.

Adjacent to the front end of the main frame, bearings are provided for a transversely disposed shaft 12 having a beveled pinion 13 meshing with a beveled pinion 14 which slidably engages a non-circular shaft 15 for which suitable bearings are provided to support said shaft in an approximately vertical position. The shaft 15 is provided, adjacent its lower end, with horizontally disposed cutting blades 16 having upstanding flanges 17 adjacent their rear edges. A collar 19 which is swiveled upon the upper end of the shaft 15 is connected by a link 20 with one arm 21 of a bell-crank lever L which is fulcrumed upon the frame, and by manipulating which, the shaft 15 may be vertically adjusted through the beveled pinion 14 with which it may be connected for rotation at the desired elevation by means of a set screw 22. It will be understood that prior to such adjustment the set screw 22 is to be loosened thereby disengaging the pinion 14 from the fixed relation to said shaft in which it is held by the action of the set screw. While the set screw is loosened the bevel pinion 14 is in a measure supported upon the bevel pinion 13, and the shaft 15 may now be adjusted vertically through the pinion by proper manipulation of the bell crank lever L. After the proper adjustment has been effected, the set screw 22 is again tightened so as to secure the pinion 14 in fixed relation to the shaft 15.

The frame bars 1 are provided with pairs of uprights 23 forming guides for vertically slidable boxes 24 wherein a shaft 25 is supported for rotation, said shaft carrying the lifting wheel B. Connected with the box 24, at each end of the shaft 25, is one end of a flexible member, such as a chain 23', the other end of which is connected with a drum or shaft 24' which is supported for rotation adjacent to the upper ends of the uprights 23, said drum or shaft having a hand wheel 25' whereby it may be conveniently rotated for the purpose of elevating or lowering the boxes wherein the shaft carrying the lifting wheel is supported. Pawl and ratchet means, indicated at 26', may be used for the purpose of sustaining the lifting wheel in any position to which it may be elevated. The rim 26 of said lifting wheel is provided with flanges 27 between which are supported a plurality of buckets 28, the outer edge of each of which is provided, about midway between the flanges 27, with a V-shaped notch 29.

A shaft 30 is supported for rotation upon the side bars of the main frame in rear of the lifting wheel and said shaft is provided with sprocket wheels 31 which are connected by chains 32 with sprocket wheels 33 upon the shaft 25 of the lifting wheel. The shaft 30 also carries sprocket wheels 34 which are connected by chains 35 with sprocket wheels 36 upon the counter-shaft 9. The pinions 10 upon the counter-shaft 9 are adapted to be connected for rotation with said counter-shaft by means of clutches 37 including members which are adapted to be actuated by shipping levers 38 for the purpose of throwing the machine into or out of gear.

Pivotally supported upon the shaft 30 in rear of the lifting wheel is a conveyer frame C carrying, adjacent to its upper end, a shaft or drum 40 which is supported for rotation. An endless conveyer of suitable construction, and including chains 41 and slats 42 is guided over the shafts 30 and 40, deriving motion from the shaft 30. The bottom of the conveyer frame is preferably formed of wire netting to constitute a screen through which dirt adhering to the beets may escape. The rear end of the conveyer frame is guided between uprights 46 rising from the frame of the machine, said uprights supporting a shaft 47 having a crank 48 whereby it may be rotated, and pinions 49 meshing with arcuate rack bars 50 upon the conveyer frame, which may thus be raised or lowered to various positions. Pawl and ratchet means 51 of ordinary well known construction are to be employed to support the conveyer frame at various positions.

The shaft 30 carries a sprocket wheel 43 which is connected by a chain 44 with a sprocket wheel 45 upon the shaft 12 through which motion may thus be transmitted to the topping device.

Suitably supported upon the main frame of the machine, below and adjacent to the rear end of the conveyer frame, is a box or receptacle 52 for the purpose of receiving the beets which are discharged over the conveyer. Said receptacle is preferably supported in such a manner that it may be readily tilted for the purpose of discharging its contents, a supporting shaft being indicated at 53, and a latch device at 54. It is obvious, however, that the box or receptacle may be mounted to tilt in any desired direction.

From the foregoing description, taken in connection with the drawings hereto annexed, the operation and advantages of the invention will be readily understood by those skilled in the art to which the same relates. As the machine is drawn over the field, the tops of the beets are detached and thrown to one side by the topping blades supported upon the shaft 15, and the lifting wheel will dig into the ground causing the beets to be engaged by the notches 29 and to be seated in the buckets whereby they are lifted and discharged upon the endless conveyer over which they are dumped into the box or receptacle 52.

Having thus described the invention, what I claim is:

1. In a machine of the character described, a wheel supported frame, and a lifting wheel supported for rotation and including a rim having flanges and buckets extending between said flanges and having V-shaped notches in their front edges midway between the flanges.

2. In a beet harvester, a main frame having supporting wheels and guiding wheels, bearing boxes supported for vertical adjustment, a shaft supported for rotation in said boxes, a lifting wheel upon the shaft, said wheel being provided with a rim, flanges extending outwardly at the side edges thereof and buckets supported upon the rim between the flanges and having notched front edges; and means for transmitting motion from the supporting wheels to the lifting wheel.

In testimony whereof I affix my signature in presence of two witnesses.

WILLIAM STINSON.

Witnesses:
C. WOODCOCK,
HUGH MACINTYRE.

---

Copies of this patent may be obtained for five cents each, by addressing the "Commissioner of Patents, Washington, D. C."